(12) United States Patent
Takenaka et al.

(10) Patent No.: US 6,533,696 B1
(45) Date of Patent: Mar. 18, 2003

(54) VEHICLE DRIVE UNIT

(75) Inventors: Masayuki Takenaka; Miyoshi Kawaguchi, both of Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/690,874

(22) Filed: Oct. 18, 2000

(30) Foreign Application Priority Data

Oct. 18, 1999 (JP) .......................................... 11-295566

(51) Int. Cl.[7] ................................................ H02K 11/00
(52) U.S. Cl. ...................... 475/150; 180/65.2; 310/71
(58) Field of Search ............................. 74/661; 475/5, 475/150; 180/65.1–65.4; 439/34; 310/71

(56) References Cited

U.S. PATENT DOCUMENTS

| | | | | |
|---|---|---|---|---|
| 5,172,006 A | * | 12/1992 | Suzuki et al. | 180/65.2 |
| 5,744,895 A | * | 4/1998 | Seguchi et al. | 310/112 |
| 5,788,006 A | * | 8/1998 | Yamaguchi | 180/65.2 |
| 6,018,694 A | * | 1/2000 | Egami et al. | 180/65.2 |
| RE36,678 E | * | 5/2000 | Moroto et al. | 180/65.4 |
| 6,166,498 A | * | 12/2000 | Yamaguchi et al. | 180/65.2 |

* cited by examiner

*Primary Examiner*—Ankur Parekh
(74) *Attorney, Agent, or Firm*—Oliff & Berridge, PLC

(57) ABSTRACT

An inverter is disposed on a cover, lead wires from an electric motor are disposed nearby an output gear in a dead space formed by diameter difference between the output gear and the motor, and the lead wires are routed to the outside of the cover at a position corresponding to the output gear portion. An upper side portion of the electric motor, which is used as a space for routing the lead wires in the conventional unit, can thus be used as a space for disposing the inverter. That is, the inverter can be disposed in the upper side of the vehicle drive unit, which now has available space as compared to the conventional unit. As a result, the vehicle drive unit and the inverter are more compact.

20 Claims, 7 Drawing Sheets

VEHICLE DRIVE UNIT

BACKGROUND OF THE INVENTION

1. Field of Invention

The invention relates to a vehicle drive unit, such as a hybrid vehicle and an electric vehicle, obtaining a vehicle drive force by a drive motor.

2. Description of Related Art

A conventional vehicle drive unit is shown in back elevation in FIG. 6 with FIG. 7 a side cross sectional diagram of the drive unit of FIG. 6.

In a conventional hybrid vehicle and an electric vehicle, an inverter (not shown), connected to an electric motor and a generator 57, is separately arranged from a hybrid drive unit 55, the vehicle drive unit. As shown in FIGS. 6 and 7, the inverter and the hybrid drive unit 55 are connected with a motor lead wires 53 routed, or pulled out, from a rear cover 52 side, which is at an opposite side to an output gear 51 of the electric motor 50.

In this structure, the upper face, side face and the rear cover 52 of the hybrid drive unit 55 are enlarged to obtain a space for routing, or positioning, the motor lead wires 53 connecting to terminals 56. As a result, the parts, especially the rear cover portion is prone to interfere with a side member of the vehicle.

Especially in the case where the inverter could be integrally disposed on an upper portion of a hybrid drive unit 55, that is the necessary space is available, the inverter can not be so disposed because a terminal 56 for routing a motor lead wire is in the way, i.e., is located at that position.

SUMMARY OF THE INVENTION

In view of the above problems associated with the related art, an object of the invention is to provide a vehicle drive unit, in which an inverter can be disposed on the upper portion of the vehicle drive unit and a rear cover side of the vehicle drive unit is compactly covered.

In order to achieve the foregoing object, according to the invention, a vehicle drive unit that obtains a drive force for driving a vehicle from an electric motor comprises the electric motor, a differential unit, a gear unit transmitting a drive force from the electric motor to the differential unit, a cover covering the electric motor, an inverter disposed on the cover, and a lead wire from the electric motor disposed in neighborhood of an output gear of the electric motor, the output gear a part of the gear unit, and in a space structured by diameter differences between the output gear and the electric motor so as to route to the outside of the cover at a position corresponding to the output gear. The electric motor and the inverter are electrically connected through the lead wire.

The lead wire is structured from a first lead wire, terminal and a second lead wire, the terminal is disposed in a portion of the cover near to the output gear by penetrating the cover. The electric motor and the terminal are connected with the first lead wire, and the inverter and the terminal are connected with the second lead wire.

A lead wire from the electric motor is connected to a stator of the electric motor.

An inverter case, in which the inverter is disposed is integrated with the cover, and a grooving space is formed between the rear portion of the cover and the inverter case. A heat sink for cooling the inverter is formed in a part of the cover between the inverter and the electric motor. A chamber portion is formed on the rear portion of the cover corresponding to the rear portion of the electric motor which substantially outlines, i.e., follows the contour of, the stator of the electric motor.

According to the invention, a lead wire from the electric motor is disposed in the vicinity of an output gear of the electric motor and in a space structured by diameter differences between the output gear and the electric motor. The lead wire is routed to the outside of the cover from the space. Therefore, the upper face portion of the electric motor of the vehicle drive unit, which is used as a space for routing or positioning the lead wire in the conventional unit, is used as a space for disposing the inverter. The inverter can then be disposed on the upper face of the vehicle drive unit, which comparatively available space in the vehicle. As a result, the vehicle drive unit is compactly structured with the inverter.

Further, the lead wire is not routed from the rear portion of the cover or the rear cover portion. Therefore, the rear cover portion is compactly structured. As a result, interference between the vehicle drive unit and vehicle side members is appreciably prevented when the vehicle drive unit is mounted.

The terminal, which is a comparatively large member, is disposed a portion of the cover near to the output gear. Therefore, the space structured by the diameter differences between the output gear and the electric motor is effectively used.

A brushless DC motor can be used as an electric motor. In such a case, the structure of the vehicle drive unit is simplified.

Because the grooving space is formed, interference with side members of a vehicle is prevented.

The heat sink for cooling the inverter is formed at a position corresponding to the rotor portion of the electric motor along with the outline of the rotor. Therefore, the heat sink is formed without wasted space.

A chamfer portion is formed on the rear portion of the cover along the outline of the stator of the electric motor, and the outline of the cover is formed along with the electric motor. Therefore, unneeded thickness of the rear portion of the cover is prevented and, then, interference with side members of a vehicle is prevented.

BRIEF DESCRIPTION OF THE DRAWINGS

The invention will be described in conjunction with the following drawings in which like features are designated with like reference characters, and wherein.

DETAILED DESCRIPTION OF PREFERRED EMBODIMENTS

The invention will become more apparent from the detailed description of a preferred embodiment with reference to the accompanying drawings.

Figure 1:
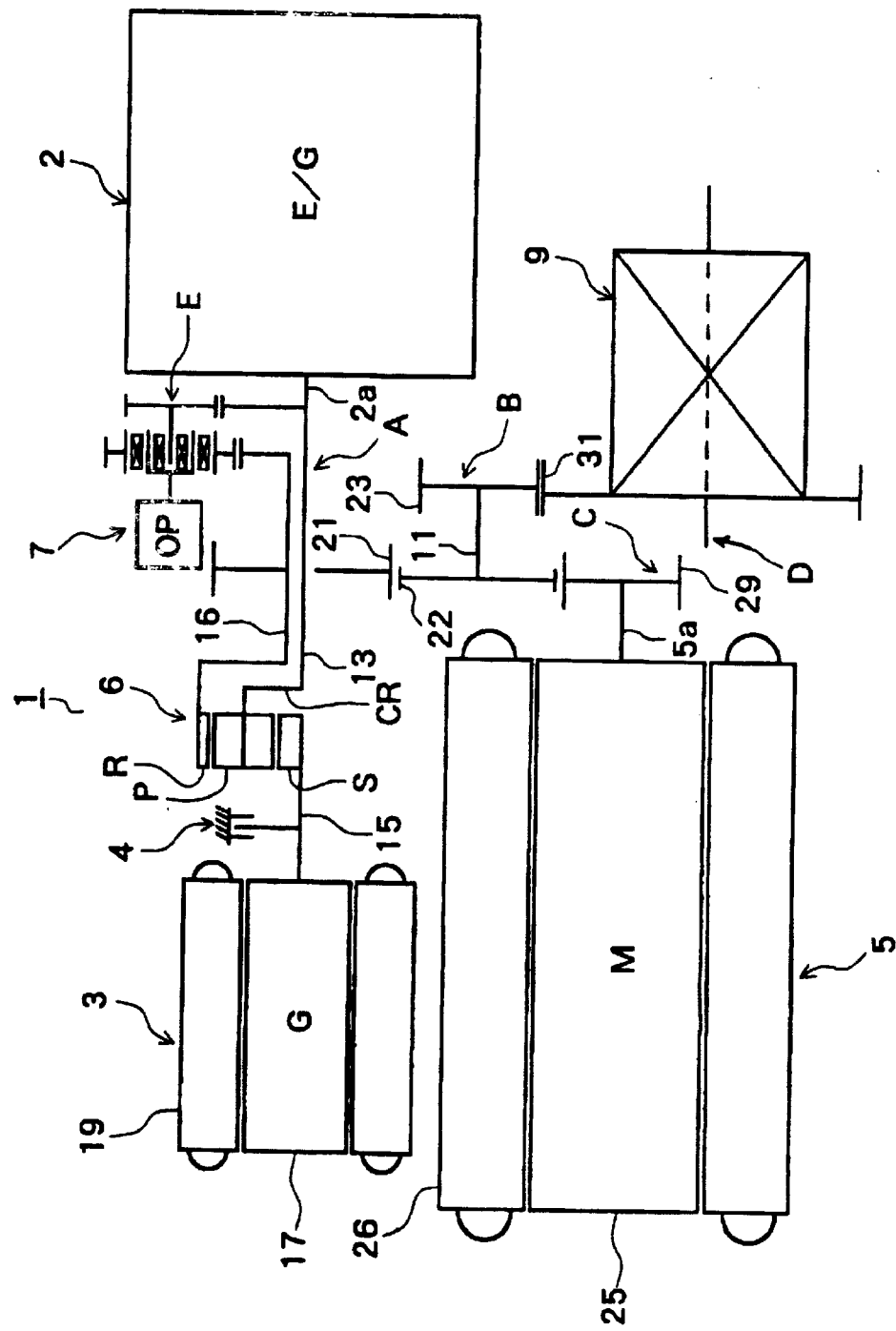
FIG. 1 is a schematic diagram showing an example of a vehicle drive unit.
Figure 2:
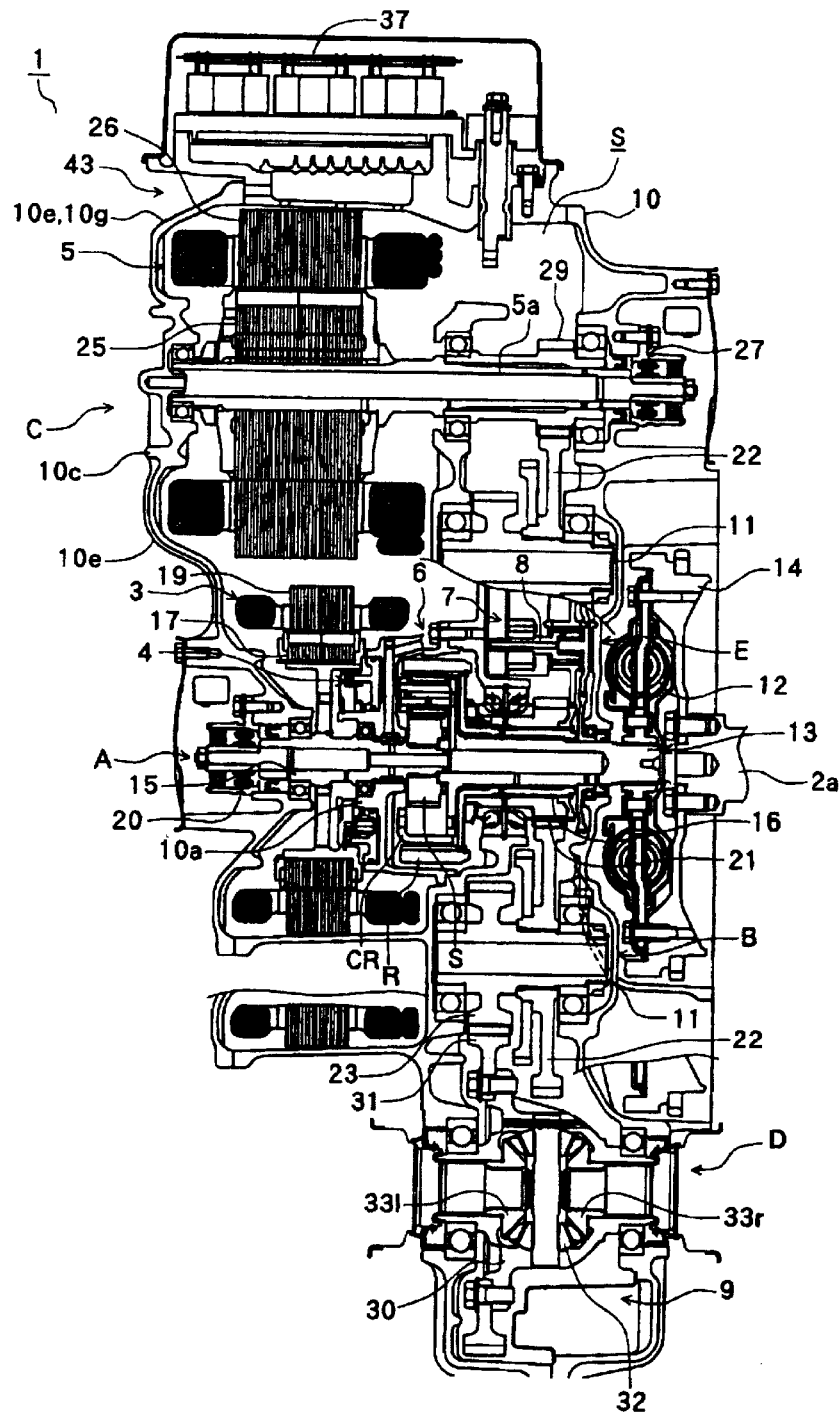
FIG. 2 is a side cross sectional diagram of a developed portion of FIG. 1.
Figure 3:
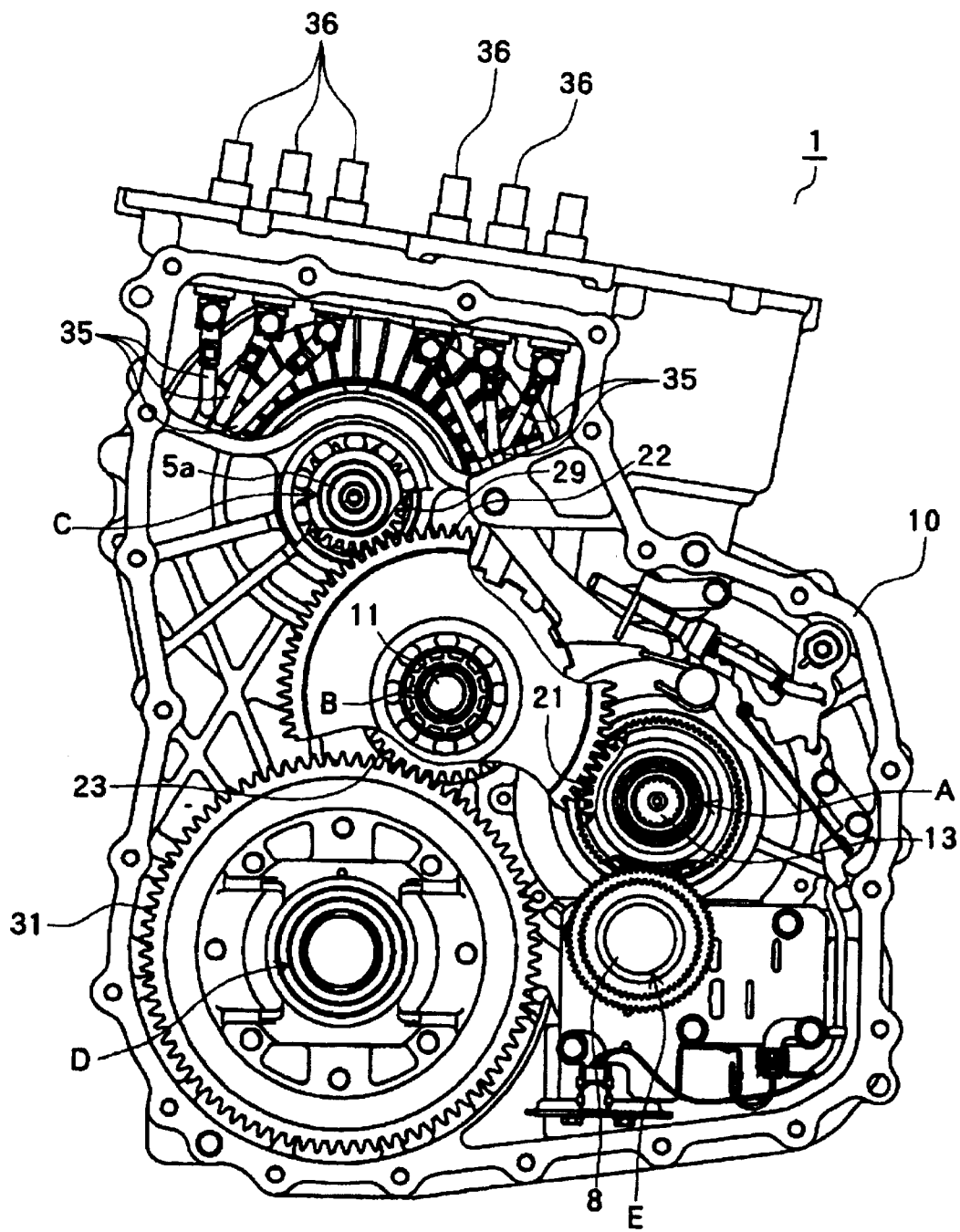
FIG. 3 is an elevation of a vehicle drive unit of FIG. 2.
Figure 4:
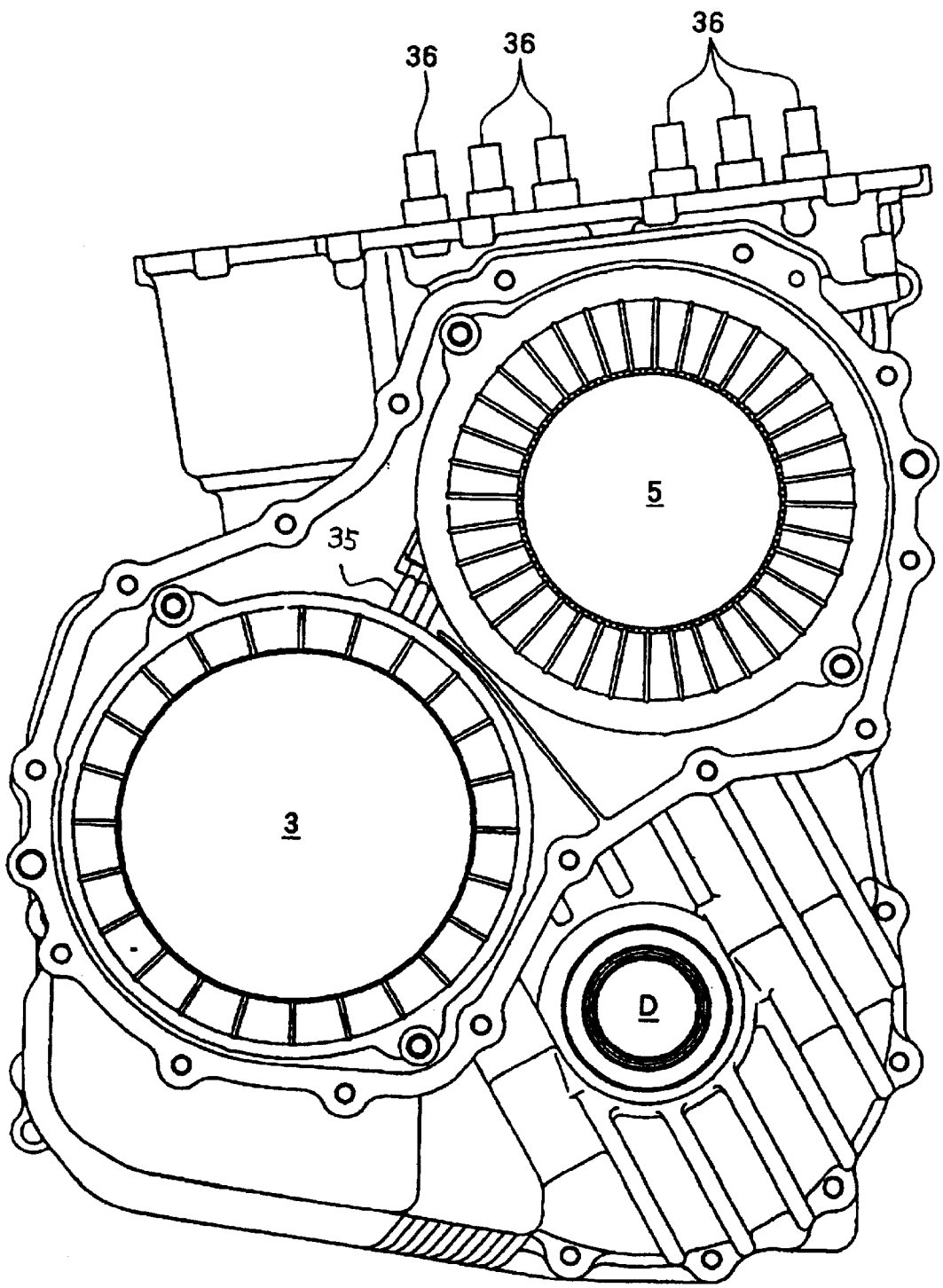
FIG. 4 is a back elevation of a vehicle drive unit of FIG. 2.

A hybrid drive unit 1, as a vehicle drive unit, comprises an internal engine 2, a generator 3 having a first electric rotation member 17, 19, a brake unit 4, an electric motor 5 having a second electric rotation member 25, 26, a planetary gear 6, a hydraulic pressure generating unit 7, and a differential unit 9. The generator 3, the brake unit 4, the motor 5, the planetary gear 6, the hydraulic pressure generating unit 7 and the differential unit 9 are disposed in a cover 10. A first axis A is aligned with an engine output shaft 2a, a second axis B structured from a counter shaft 11, a third axis C structured from a motor output shaft 5a, a fourth axis D structured from drive wheel shafts extending from the differential unit 9 to left and right sides, and a fifth axis E (FIGS. 1 and 3) structured from a drive shaft 8, a drive member of an oil pump are disposed as shown in FIGS. 2 and 3. That is, the first axis A, the third axis C and the fourth axis D are disposed so as to surround the second axis B structured from the counter shaft. The fifth axis E is disposed below the first axis A and to the side of the fourth axis D. FIG. 2 shows the vehicle drive unit, in which the first through fourth axes A, B, C, D are schematically portrayed whereas FIG. 3 is a cross-section of the vehicle drive unit.

On the first axis A, an input shaft 13 is connected, through a flywheel 14 and a damper 12, to the engine output shaft 2a. Further, the generator 3, the brake unit 4 and the planetary gear 6 are disposed along the first axis A. The oil pump 7 is connected to the input shaft 13. The sun gear S of the planetary gear 6 is connected to a transmission shaft (rotor shaft) 15 transmitting a torque to the generator 3; the carrier CR, supporting the pinions P, is connected to the input shaft 13, the ring gear R is connected to a running rotation shaft 16 structured from a sleeve which is arranged around the input shaft 13. The generator 3 comprises a rotor 17 fixed to the transmission shaft 15 and a stator 19 fixed to the cover 10. An excitational generator and the like are usable as the generator 3, however, a magneto generator, such as a brushless DC motor/generator, in which a permanent magnet is used in the rotor, is preferable. A rotational position sensor 20, such as a resolver, is disposed on a portion of the transmission shaft 15, which passes through the rear cover 10c, and correctly detects a rotational position of the rotor for minutely controlling the rotation.

A counter drive gear 21 for engine output is fixed to the running rotation shaft 16, a large gear 22 and a small gear 23 are integrally fixed on the counter shaft 11, and the counter drive gear 21 is in mesh with the large gear 22. The positional relationship of the large gear 22 and the small gear 23 in FIG. 1 is reversed in FIG. 2. This is for expediency in explanation.

The electric motor 5 comprises a rotor 25 integrally fixed to the output shaft 5a and a stator 26 fixed to the case 10. A DC motor, an induction AC motor and the like can be used as the electric motor. However, a brushless DC motor having a permanent magnet in the rotor is preferable. A rotational position sensor 27, such as a resolver, is disposed on a portion of the output shaft 5a, which passes through the cover 10 at the opposite side of the motor 5, and correctly detects a rotational position of the rotor 25 for controlling the motor output. A counter drive gear 29 for motor output is integrally fixed to the motor output shaft 5a, and the gear 29 is also meshed with the large gear 22 on the counter shaft.

The differential unit 9 comprises an input gear 31 fixed to a differential case 30. The input gear 31 is meshed with the small gear 23 on the counter shaft. A center gear 32, which is supported by the differential case 30, is meshed with left and right side gears 33l, 33r, separates and transmits an input torque from the input gear 31 to the left and right side gears 33l, 33r, then, left and right drive wheel shafts connected to left and right front wheels are driven.

Figure 5:
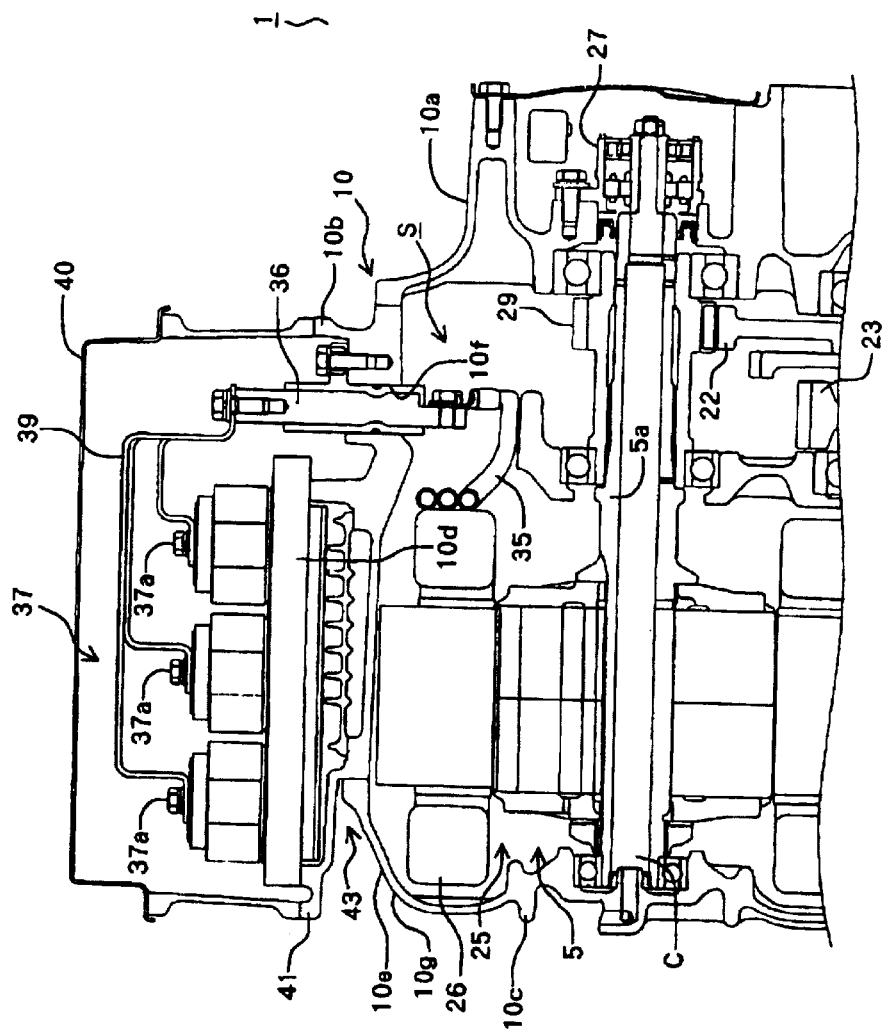
FIG. 5 is a partial side cross sectional diagram showing the vehicle drive unit of FIG. 2.
Figure 6:
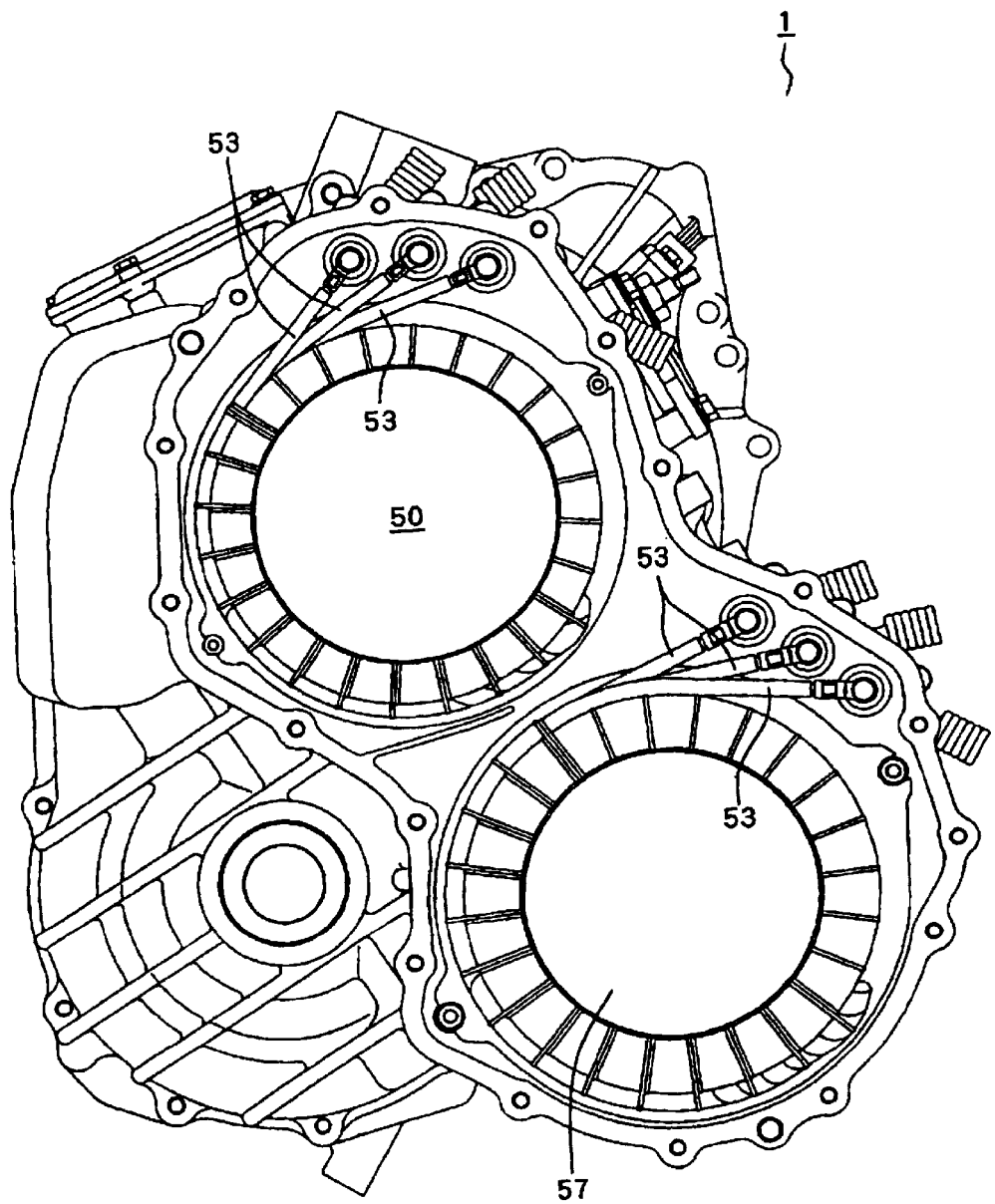
FIG. 6 is a back elevation showing a conventional vehicle drive unit.
Figure 7:
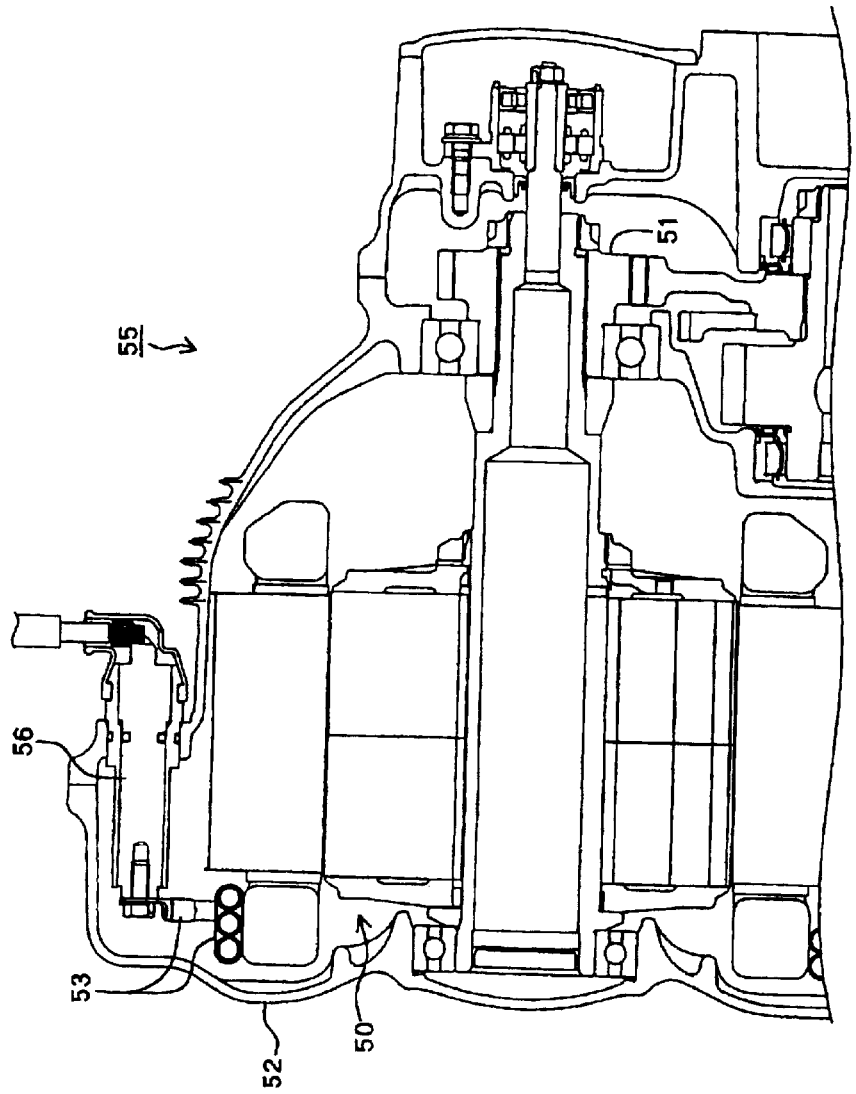
FIG. 7 is a side cross sectional diagram showing the vehicle drive unit of FIG. 6.

As shown in FIG. 5, a cylindrical main cover 10b is disposed at the center position, a front cover 10a is connected to the main cover 10b at the right side, in FIG. 5, and a rear cover 10c is connected to the main cover 10b at the left side of FIG. 5. Thus, the cover 10 is integrally structured from the main cover 10b, the front cover 10a and the rear cover 10c. As shown in FIG. 5, the electric motor 5 is disposed in the main cover 10b.

One end of three first lead wires 35 are connected to the stator 26, including a coil, of the electric motor 5. The generator 3 is connected to three first lead wires 35 in the same manner (not shown). The first lead wires 35 are routed from a portion of the electric motor 5 close to the counter drive gear 29 and through a peripheral space of the counter drive gear 29. The portion close to the counter drive gear 29 is a portion which is within the axial, which is left-right direction in FIG. 5, length of the gear unit structured from the counter drive gear 29, the large gear 22, the small gear 23 and the input gear 31 of the differential unit 9 and which is at a radial outer side of the output shaft 5a. Generally, the counter drive gear 29 of the electric motor 5 is structured from a smaller diameter gear than the large gear 22 on the counter shaft 11 which is connected to the differential unit 9. Therefore, in a portion S, which is adjacent to the periphery of the counter drive gear 29 and to a right side of the electric motor 5 in FIG. 5, a dead space is formed around the counter drive gear 29 by the stator 26 of the electric motor 5 having comparatively large diameter and the counter drive gear 29 having a smaller diameter. Thus, the first lead wires 35 are disposed in the space S, which surrounds the counter drive gear 29 and is dead space.

Six penetrating holes 10f are formed on the center upper portion of the cover 10, which correspond to the peripheral space S of the counter drive gear 29. A terminal 36 is disposed in each of the penetrating holes 10f. The other ends of the first lead wires 35 from the electric motor 5 are individually connected to three terminals 36 arranged to the left side of FIG. 3, and the other ends of the first lead wires 35 from the generator 3 are connected to the other three terminals 36 arranged to the right side of FIG. 3.

A heat sink 10d for cooling is formed in the main cover 10b, as shown in the upper portion of FIG. 5, adjacent the electric motor 5. An inverter 37 is disposed on the heat sink 10d. Second lead wires 39 from the six terminals 36 are connected to terminals 37a of the inverter 37. The cover 40 covers the upper portion of the inverter 37. To the left side of FIG. 5, a streamlined chamfer portion 10e is formed on the upper portion of the rear cover 10c corresponding to the electric motor 5. The streamlined chamfer portion 10e is formed extending in the radial direction from the output shaft 5a and around an outline of the stator 26. A space 43 having a cross section of a triangular groove is formed between an inverter case 41, integrated with the cover 10 and covering the inverter 37, and a periphery portion 10g of the rear cover 10c.

The hybrid drive unit 1 comprises the aforementioned structure, the drive force occurred by the rotation of the electric motor 5 is transmitted through the counter drive gear 29 to the large gear 22 on the counter shaft 11, and further outputted through the differential unit 9 to the drive wheel shaft D. The output from the engine 2 is transmitted to the input shaft 13, separated by the planetary gear 6, disposed on the same axis as the input shaft 13. Thus, the output from the engine 2 rotationally drives the generator 3 as necessary.

Further, the output from the engine 2 is transmitted to the large gear 22 on the counter shaft 11, and is transmitted through the differential unit 9 to the drive wheel axis D.

The first lead wires 35, connecting the electric motor 5 and the terminals 36 in the cover 10, and the terminals 36, connecting the first lead wires 35 through the first lead wires 39 to the inverter 37, are disposed in the periphery space S of the counter drive gear 29 of the electric motor 5, that is, in the front dead space of the counter drive gear 29 of the electric motor 5. Therefore, space for disposing the first lead wires 35 and the terminals 36 is not needed at the rear cover 10c side. As a result, the rear cover 10c can be formed to conform with the outline of the stator 26 of the electric motor 5.

As with the electric motor 5, the first lead wires 35 and the terminals 36 for the generator 3 are routed or positioned at the counter drive gear 21 side which is on the right side of the generator 3 in FIG. 2.

Further, the first lead wires 35 are not limited to connecting to the stators 26, 29 of the electric motor 5 and the generator 3, respectively, the first lead wires 35 can be connected to the rotors 25, 17 according to the motor structure.

Further, the disposition of the first lead wires 35 and the terminals 36 is flexible so long as they are disposed near the counter drive gear 29, as the output gear, and in the dead space formed by the diameter difference between the output gear and the electric motor. Therefore, an appropriate cable supporting portion, such as grooves, can be formed in the cover 10 for supporting the lead wires.

In this embodiment, the invention is described with a vehicle drive unit comprising an electric motor of a hybrid vehicle obtaining a drive force from an electric motor and an internal engine. However, the invention is not limited to a hybrid vehicle, and is applicable to a vehicle drive unit of an electric vehicle obtaining a drive force from only an electric motor.

The invention should not be limited to the foregoing embodiments but can be modified in various ways based on its gist, and any such modifications should not be excluded from the scope of the invention.

What is claimed is:

1. A vehicle drive unit obtaining a drive force for driving a vehicle by the drive force of an electric motor, comprising:
   a differential unit;
   a gear unit transmitting a drive force from the electric motor to the differential unit;
   a cover covering the electric motor;
   an inverter;
   a lead wire from the electric motor electrically connecting the electric motor and the inverter wherein the lead wire is disposed in a space structured by diameter differences between an output gear of the electric motor, which structures a part of the gear unit, and the electric motor, and is routed to the outside of the cover.

2. The vehicle drive unit according to claim 1, wherein the inverter is disposed on the cover, a terminal penetrates the cover, the electric motor and the terminal are connected with the lead wire as a first lead wire, and the inverter and the terminal are connected with a second lead wire.

3. The vehicle drive unit according to claim 2, wherein the first lead wire from the electric motor is a lead wire connected to a stator of the electric motor.

4. The vehicle drive unit according to claim 3, wherein an inverter case, in which the inverter is disposed, is integrated with the cover, and a grooving space is formed between a rear portion of the cover and the inverter case.

5. The vehicle drive unit according to claim 4, wherein a chamfer portion is formed on the rear portion of the cover corresponding to the rear portion of the electric motor following a contour of the stator of the electric motor.

6. The vehicle drive unit according to claim 3, wherein a chamfer portion is formed on a rear portion of the cover corresponding to the rear portion of the electric motor following a contour of the stator of the electric motor.

7. The vehicle drive unit according to claim 2, wherein an inverter case, in which the inverter is disposed, is integrated with the cover, and a grooving space is formed between a rear portion of the cover and the inverter case.

8. The vehicle drive unit according to claim 7, wherein a chamfer portion is formed on the rear portion of the cover corresponding to the rear portion of the electric motor following a contour of the stator of the electric motor.

9. The vehicle drive unit according to claim 2, wherein a chamfer portion is formed on a rear portion of the cover corresponding to the rear portion of the electric motor following a contour of the stator of the electric motor.

10. The vehicle drive unit according to claim 1, wherein an inverter case, in which the inverter is disposed, integrated with the cover, and a grooving space is formed between a rear portion of the cover and the inverter case.

11. The vehicle drive unit according to claim 10, wherein a chamfer portion is formed on the rear portion of the cover corresponding to the rear portion of the electric motor following a contour of the stator of the electric motor.

12. The vehicle drive unit according to claim 1, wherein a heat sink for cooling the inverter is formed in a part of the cover between the inverter and the electric motor.

13. The vehicle drive unit according to claim 12, wherein a chamfer portion is formed on a rear portion of the cover corresponding to the rear portion of the electric motor following a contour of the stator of the electric motor.

14. The vehicle drive unit according to claim 1, wherein a chamfer portion is formed on a rear portion of the cover corresponding to the rear portion of the electric motor following a contour of the stator of the electric motor.

15. A vehicle drive unit, comprising:
    a generator disposed on an axis of an engine;
    an electric motor disposed on a second axis parallel to the axis of the engine;
    a cover covering the generator and the electric motor;
    an invertor;
    a lead wire from the electric motor electrically connecting the electric motor and the inverter;
    a lead wire from the generator electrically connecting the generator and the inverter, wherein the lead wire from the electric motor and the lead wire from the generator are routed to the outside of the cover from an engine side of the electric motor and the generator in an axial direction.

16. The drive unit according to claim 15, wherein the inverter is disposed on the cover, at least one terminal penetrates the cover, wherein a terminal of the at least one terminal is connected to the lead wire from the electric motor and another terminal of the at least one terminal is connected to the lead wire from the generator as first lead wires, and the at least one terminal and the inverter are connected with a second lead wire.

17. The drive unit according to claim 15, wherein the cover further covers a differential unit and a gear unit transmitting a drive force from the electric motor and the generator to the differential unit, and the lead wire from the electric motor is disposed in a space structured by diameter differences between an output gear of the electric motor, which structures a part of the gear unit, and the electric motor.

18. A vehicle drive unit, comprising:
   a generator disposed on an axis of an engine;
   an electric motor disposed on a second axis parallel to the axis of the engine;
   a cover covering the generator and the electric motor;
   an inverter disposed on the cover;
   a lead wire from the electric motor electrically connecting the electric motor and the inverter;
   a lead wire from the generator electrically connecting the generator and the inverter, wherein the lead wire from the electric motor and the lead wire from the generator are routed to the outside of the cover from the same side of the electric motor and the generator in an axial direction.

19. The drive unit according to claim 18, wherein at least one terminal penetrates the cover, a terminal of the at least one terminal is connected to the lead wire from the electric motor and another terminal of the at least one terminal is connected to the lead wire from the generator as first lead wires, and the at least one terminal and the inverter are connected with a second lead wire.

20. The drive unit according to claim 18, wherein the cover further covers a differential unit and a gear unit transmitting a drive force from the electric motor and the generator to the differential unit, and the lead wire from the electric motor is disposed in a space structured by diameter differences between an output gear of the electric motor, which structures a part of the gear unit, and the electric motor.

* * * * *